(12) United States Patent
Didwiszus et al.

(10) Patent No.: US 10,933,856 B2
(45) Date of Patent: Mar. 2, 2021

(54) PILOT UNIT, ACTUATOR SYSTEM AND METHOD FOR PRODUCING SAID SYSTEM

(71) Applicant: WABCO Europe BVBA, Brussels (BE)

(72) Inventors: Lars Didwiszus, Sarstedt (DE);
Karsten Runge, Springe (DE);
Hartmut Schappler, Hannover (DE);
Andreas Teichmann, Isernhagen (DE);
Ingo Torhoff, Barsinghausen (DE)

(73) Assignee: WABCO EUROPE BVBA, Brussels (BE)

( * ) Notice: Subject to any disclaimer, the term of this patent is extended or adjusted under 35 U.S.C. 154(b) by 0 days.

(21) Appl. No.: 16/326,033

(22) PCT Filed: Jun. 20, 2017

(86) PCT No.: PCT/EP2017/000715
§ 371 (c)(1),
(2) Date: Feb. 15, 2019

(87) PCT Pub. No.: WO2018/033231
PCT Pub. Date: Feb. 22, 2018

(65) Prior Publication Data
US 2019/0176792 A1    Jun. 13, 2019

(30) Foreign Application Priority Data
Aug. 16, 2016    (DE) .......................... 102016009944.5

(51) Int. Cl.
*F15B 13/044* (2006.01)
*B60T 15/02* (2006.01)
(Continued)

(52) U.S. Cl.
CPC ............ *B60T 15/027* (2013.01); *B60T 7/042* (2013.01); *B60T 8/3605* (2013.01);
(Continued)

(58) Field of Classification Search
CPC .... B60T 8/3605; B60T 15/027; B60T 13/662; B60T 13/683
(Continued)

(56) References Cited

U.S. PATENT DOCUMENTS 5,102,096 A * 4/1992 Siegel ................... B60T 8/3675
251/129.15
5,458,150 A * 10/1995 Tamaoki ............... B60T 8/3675
137/596.17
(Continued)

FOREIGN PATENT DOCUMENTS

DE    2424492 A1    12/1974
DE    10003205 A1    11/2000
(Continued)

OTHER PUBLICATIONS

International Search Report for WO Application No. PCT/EP2017/000715 dated May 17, 2018, 3 pages.
(Continued)

*Primary Examiner* — Christopher P Schwartz
(74) *Attorney, Agent, or Firm* — Warner Norcross + Judd LLP

(57) ABSTRACT

An electropneumatic pilot unit for controlling a pneumatic consumer is provided herein. The pilot unit comprises at least two electromagnetic pilot valves. Each of the electromagnetic pilot valves comprises a coil for producing a magnetic flux along a valve axis, an armature which can be moved in the axial direction of the valve axis, a valve seat which can be closed and opened by the armature, and a pneumatic inlet port and a pneumatic outlet port. At least two of the pilot valves lie next to each other with parallel valve axes. Each pilot valve has a port which protrudes towards a common underside for connection to a pilot chamber of the consumer controlled by the pilot valves.

17 Claims, 5 Drawing Sheets

(51) Int. Cl.
| | |
|---|---|
| *B60T 13/66* | (2006.01) |
| *B60T 13/68* | (2006.01) |
| *B60T 17/04* | (2006.01) |
| *B60T 7/04* | (2006.01) |
| *B60T 8/36* | (2006.01) |
| *F16K 31/42* | (2006.01) |
| *B60T 8/32* | (2006.01) |

(52) U.S. Cl.
CPC .......... *B60T 8/3675* (2013.01); *B60T 13/662* (2013.01); *B60T 13/68* (2013.01); *B60T 13/683* (2013.01); *B60T 15/02* (2013.01); *B60T 17/04* (2013.01); *F16K 31/42* (2013.01); *B60T 8/327* (2013.01)

(58) Field of Classification Search
USPC ....... 303/118.1, 119.3, DIG. 10; 137/315.03, 137/315.11, 596.17; 251/129.02, 129.05, 251/129.21
See application file for complete search history.

(56) References Cited

U.S. PATENT DOCUMENTS

| | | | | |
|---|---|---|---|---|
| 6,453,936 | B1* | 9/2002 | Frank | ..................... B60T 8/323 |
| | | | | 137/315.03 |
| 6,626,505 | B2* | 9/2003 | Frank | ..................... B60T 8/327 |
| | | | | 137/596.17 |
| 8,246,121 | B2 | 8/2012 | Homann et al. | |
| 8,434,520 | B2* | 5/2013 | Frank | ..................... B60T 8/327 |
| | | | | 137/315.03 |
| 10,093,293 | B2* | 10/2018 | Lulfing | ................. B60T 13/683 |
| 2001/0033105 | A1 | 10/2001 | Frank et al. | |
| 2003/0025388 | A1* | 2/2003 | Roether | .................. B60T 8/327 |
| | | | | 303/15 |
| 2004/0239178 | A1 | 12/2004 | Otsuka | |
| 2009/0250998 | A1* | 10/2009 | Hinz | ..................... B60T 8/368 |
| | | | | 303/119.3 |

FOREIGN PATENT DOCUMENTS

| | | |
|---|---|---|
| DE | 10009116 A1 | 8/2001 |
| DE | 10062625 A1 | 10/2001 |
| DE | 102007052697 A1 | 5/2009 |
| DE | 12014011422 A1 | 2/2016 |
| EP | 1128106 A2 | 8/2001 |
| WO | 199502531 A1 | 1/1995 |
| WO | 2008034525 A1 | 3/2008 |

OTHER PUBLICATIONS

Machine assisted translation of DE2424492A1 obtained from https://worldwide.espacenet.com on Mar. 7, 2019, 26 pages.
Machine assisted translation of DE10003205A1 obtained from https://worldwide.espacenet.com on Mar. 7, 2019, 9 pages.

\* cited by examiner

PILOT UNIT, ACTUATOR SYSTEM AND METHOD FOR PRODUCING SAID SYSTEM

CROSS-REFERENCE TO RELATED APPLICATIONS

This application is the U.S. national stage of PCT/EP2017/000715, filed Jun. 20, 2017, which claims priority to German Patent Application No. 10 2016 009 944.5, filed Aug. 16, 2016, both of which are incorporated herein by reference in their entirety.

FIELD OF THE DISCLOSURE

The disclosure concerns a pilot unit and an actuator system with such a pilot unit, and a method for producing said system. The actuator system may in particular be a dual-channel electropneumatic or electrohydraulic axle modulator for a brake system of a vehicle.

BACKGROUND

Axle modulators in brake systems serve to control a brake pressure at the connected brake circuits of an axle. Axle modulators of EBS systems (electronic brake systems) generally control a system pressure of a compressed air storage reservoir via blocking valves (e.g., an inlet valve and an outlet valve) directly to a relay valve, which supplies a wheel brake with compressed air via a brake line. For safety reasons, a pneumatic fallback level may be provided. For this e.g. redundancy valves of the axle modulator may receive a brake pressure control line, which supplies an analog brake pressure input by the driver via a brake pedal and brake valve. If the electronic control unit is switched off or faulty, the normally open redundancy valve conducts the analog brake pressure to a pneumatic control line to which the relay valve of the brake circuit is connected.

When the control unit is switched on or functioning, the redundancy valve is blocked and a reservoir pressure or system pressure from a connected compressor reservoir is passed on via the inlet valve, e.g. in cyclic fashion, to the relay valve. Thus, e.g. a brake pedal travel may be sensed and a control pressure then taken from the reservoir pressure directly at the axle via an electric brake value emitter connected to the brake pedal. Accordingly, an outlet valve is provided for purging the pneumatic control line which leads to the relay valve.

The relay valve thus constitutes a pneumatic consumer, the pneumatic control input of which is controlled via several electropneumatic precontrol or pilot valves.

Thus in a single-circuit axle modulator, three electrically actuated pilot valves, generally 2/2-way blocking valves, may be provided for each brake circuit and connected to the relay valve. Such a configuration of a pilot unit with three pneumatic pilot valves generally requires a complex construction, the electrical connections of which point to a common control unit (ECU) and the pneumatic connections of which on one side point towards the relay valve. The pilot valves are generally placed in bores which run vertically in an air distribution housing, so that the pilot valves protrude from the housing in their axial direction and are closed by an additional cover at their other remote end which may serve as an armature end stop for the armatures. Further bores, which do not run vertically, e.g. a lateral bore and generally oblique bores, are required in the air distribution housing to connect the valves. These bores are difficult to produce, either post-manufacture or e.g. in a plastic injection molding using oblique sliders in the injection molding tool. The resulting construction may also requires a corresponding installation volume. For further functions of the valves, e.g. also 3/2-way valves, additional further pneumatic channels may be formed in the air distribution housing.

The channels leading to the pilot chamber or control port of the pneumatic consumer form an air volume which may be filled for actuation and then purged again. In a relay valve for example, this extends the corresponding response time or actuation time and increases the air consumption.

BRIEF SUMMARY

A pilot unit for controlling a fluid-actuated consumer is provided herein. The pilot unit comprises at least two electromagnetic pilot valves. Each of the at least two electromagnetic pilot valves comprises a coil for producing a magnetic flux along a valve axis. Each of the at least two electromagnetic pilot valves further comprises an armature which can be moved in an axial direction of the valve axis. Each of the at least two electromagnetic pilot valves further comprises a valve seat which can be closed and opened by the armature. Each of the at least two electromagnetic pilot valves further comprises a fluid inlet port for a fluid and a fluid outlet port for the fluid. At least two of the pilot valves lie next to each other with parallel valve axes. Each pilot valve has a port which protrudes towards a common underside for connection to a pilot chamber of the consumer controlled by the pilot valves.

BRIEF DESCRIPTION OF THE DRAWING

The invention is described in greater detail below with reference to the accompanying figures, in which.

DETAILED DESCRIPTION

Figure 1:
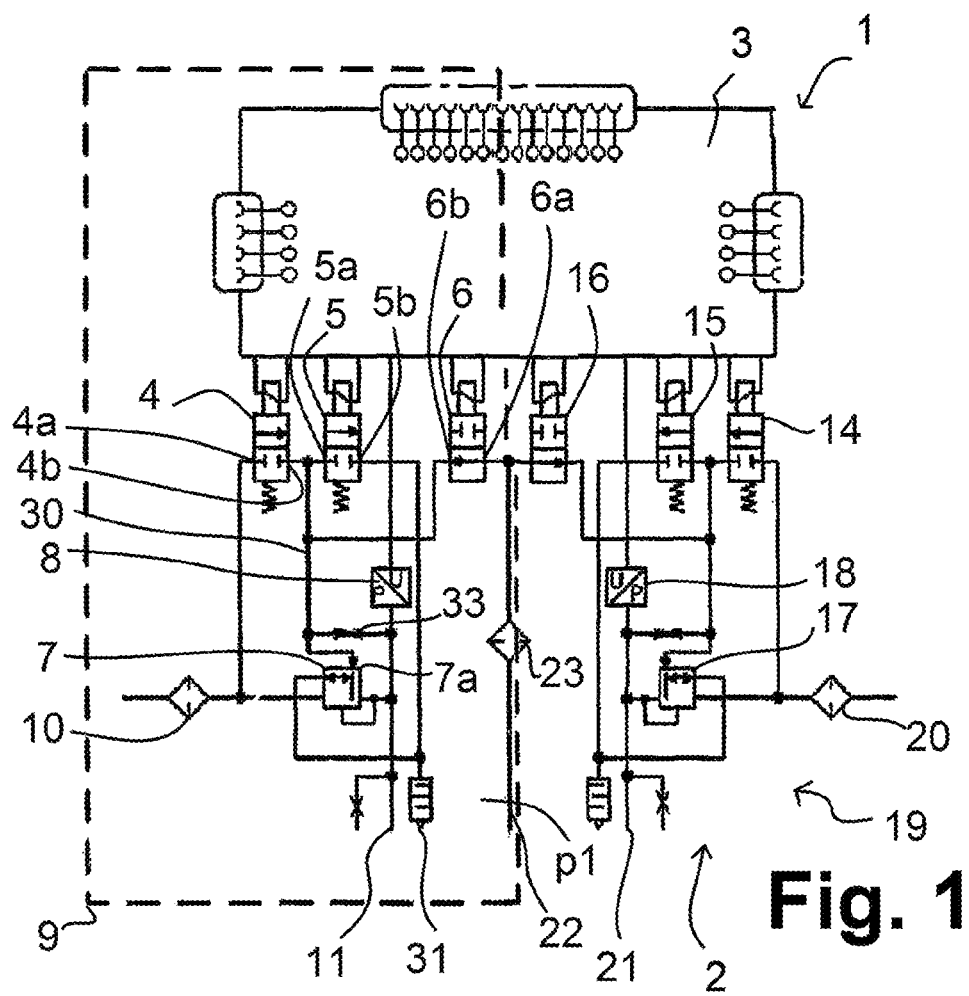
FIG. 1 is an electropneumatic circuit diagram of a dual-channel axle modulator for a brake system of a vehicle.
Figure 2:
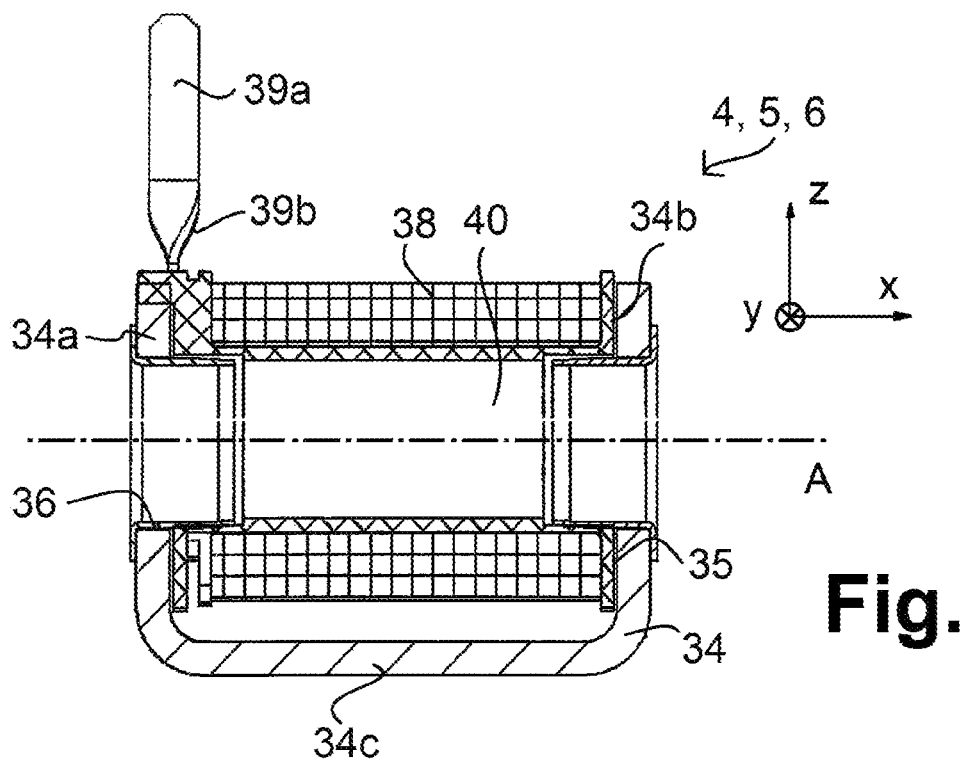
FIG. 2 is a section through a pilot valve of the electropneumatic pilot unit without armature and core.

With reference to the specific embodiment of the figures, wherein like numerals generally indicate like parts throughout the several views, an electropneumatic pilot unit for an electropneumatic actuator system, such an electropneumatic actuator system and a method for its production, which can be formed at low cost is provided herein.

In certain embodiments, the electropneumatic actuator system provided herein is a dual-channel electropneumatic axle modulator for a brake system.

As described herein, the at least two or more pilot valves, in certain embodiments, electropneumatic pilot valves, are positioned next to each other such that their ports to be connected to the inlet port or pilot chamber of the consumer protrude towards a common underside. The pilot valves are therefore arranged next to each other, in various embodiments, parallel next to each other, in a sideways (lateral)

direction perpendicular to their axial direction, wherein their ports protruding towards the common pilot chamber point towards or are formed open in the third direction, i.e. vertically to their underside.

The pilot unit may thus be placed on the consumer in the vertical direction, so that the ports to be connected to the pilot chamber of the consumer, e.g. the outlet port of a redundancy valve and of an inlet valve and the inlet port of an outlet valve, together protrude downward.

A common channel routing of these downwardly protruding ports is no longer necessary since they can open directly into the connecting chamber, in certain embodiments, the pilot chamber of the consumer.

Thus, in various embodiments, it is no longer necessary to form bores or channels in an air distribution housing arranged below the valves. The fluid connection, in certain embodiments, the pneumatic connection at the common consumer, takes place in the vertical direction (i.e. downward), while the further fluid routings, e.g. air routings, run, in various embodiments, initially in the plane perpendicular to the vertical direction. In other words, the further fluid routings may run in the axial direction of the valves, and in some cases in a transverse direction, through suitable fluid channels in an attached fluid guidance element (air guidance element).

Thus, in certain embodiments, the several pilot valves may be arranged lying down. In other words, the several pilot valves may be with a horizontal arrangement of the common fluid-actuated consumer to be connected. The pilot unit with the pilot valves and a fluid guidance element, lying as a substantially horizontal or flat unit with its ports pointing downward, may then be placed in the vertical direction directly onto the pilot chamber of the consumer.

In this way, further pneumatic channels or supplies to the consumer are not required. In various embodiments, a large consumer may be provided with a pilot chamber which extends to below the fluid ports of the pilot valves. Thus the fluid ports of the pilot valves may transform directly into the pilot chamber. In other words, the fluid ports of the pilot valves may transform directly into the consumer, so that in the hardware configuration no additional fluid control line between the pilot valves and the consumer is actually required. In other words, no pneumatic control line which is generally provided in circuit diagrams may be required.

Thus, in certain embodiments, with an electropneumatic system, a small pneumatic volume of the pneumatic control line from the several pilot valves to the pilot chamber can be achieved. Pneumatic actuation may take place directly and immediately without unnecessary delay. The compressed air consumption is kept low since only a small volume need be filled and purged. Also, a large configuration of the consumer, e.g. a relay valve which extends over the ports of the valves in the horizontal plane, allows an effective conversion of the control pressure into a force.

The pilot unit may be placed directly on the pilot chamber of the consumer, e.g. via a shaped gasket. Thus a complex pneumatic seal, such as O-rings etc. are not required. The shaped gasket may be formed from a flexible material to fit all pneumatic connections and be placed vertically between the pilot unit and the pneumatic consumer.

The fluid guidance element or fluid distribution element may be placed on the several valves in the axial direction and, in certain embodiments, serves for fluid connection of the ports not pointing towards the consumer. In an axle modulator, therefore, the inlet ports of the inlet valve and the redundancy valve, and the outlet port of the outlet valve, can be formed via the common fluid guidance element. These connections can be conducted downward via the fluid guidance element and then e.g. also in the vertical direction next to e.g. the pneumatic consumer. Thus a common seal can be formed both for the connections on e.g. the pneumatic consumer and for the further connections.

The pneumatic actuator system with the pilot unit and pneumatic consumer may therefore be formed so as to be small and compact. No valves protruding from the pilot housing with an additional end termination by a connecting cover may be required. The installation space thus saved may be e.g. used for larger lateral or horizontal dimensioning of the consumer or its control piston.

Furthermore, the pilot unit can be formed economically, in certain embodiments, as a modular system. The pilot valves may be, in certain embodiments, received with their parallel valve axes next to each other on a common yoke bracket, wherein they are e.g. placed next to each other between the two legs of the common yoke bracket. Thus only one common yoke bracket is required which e.g. may be formed as a curved plate of ferritic steel and allows the magnetic flux of each valve to be conducted outside the interior of the coil. Magnetic crossflows between the pilot valves may be suppressed e.g. by holes in the yoke bracket between the pilot valves.

This allows an economic modular configuration using standardized starting materials for different valve systems or consumers, in which a yoke bracket is trimmed accordingly (in the transverse direction) and the necessary number of the several valves placed inside the yoke bracket. The pilot valves may in principle be formed with the same or largely similar parts for different functions. Thus 2/2-way blocking valves may be configured in standardized form. In other words, the 2/2-way blocking valves may be configured with the same valve parts to be used in the coil interior, e.g. armature, core (valve tube) and armature spring, in order e.g. also to allow optional configuration as a normally open or normally closed blocking valve. Mounting or assembly takes place by direct insertion in the common yoke bracket.

The valves or common yoke bracket may be fixed to the fluid guidance element e.g. by catches or by automatic clamping, at least during assembly, e.g. by lateral latching hooks or similar self-latching mechanisms. Thus the air guidance element may be positioned and engaged directly in the axial direction.

The modular construction of the valves in a common yoke bracket may be further simplified. Thus e.g. a mounting protection or cross-connection protection may be established, e.g. a poka-yoke design of the different valves, in order to avoid incorrect installation. Thus a standardized yoke bracket or yoke bracket of suitable length for insertion of suitable valves may be kept in stock.

The electronic control unit with its circuit carrier, e.g. printed circuit board, may in turn be placed directly vertically on the pilot unit e.g. on upwardly protruding contact pins.

A particular advantage results even with multi-circuit systems, in certain embodiments, a dual-channel pneumatic axle modulator, since two pilot units for the two brake circuits or brake channels may be placed together on a common central air guidance element. This module therefore comprises the several pilot valves adjoining each other laterally for each circuit or channel, which in the axial direction are joined by the central air guidance element between the two actuation modules. Thus a common pilot unit may be formed for two channels with just a single air guidance element as one component, which then may be placed directly on the two relay valves or a component receiving the two relay valves, and secured e.g. by screws with shaped gaskets in between.

Furthermore, complete preassembly of the pilot unit and testing of its pneumatic and/or electrical properties are possible, wherein handling is simplified. First a pilot unit may be formed for e.g. two circuits together, in that in modular fashion the valves are each placed on the common central air guidance element, and the resulting pilot unit can then be tested or checked electrically and/or pneumatically, and then the tested pilot unit can be placed directly e.g. via the shaped gasket on the pneumatic consumer and secured. This increases the production efficiency of the devices.

In addition, further pressure sensors may be integrated e.g. for sensing an reservoir pressure or analog control pressure, wherein the pressure sensors are, in certain embodiments, received on the electronic control unit or its circuit board, contacted and connected to a suitable pneumatic chamber of the air guidance element. Thus additional pressure sensors can easily be connected without e.g. forming additional bores in a housing.

As well as an axle modulator, for example other electropneumatic actuator systems can be formed. Thus instead of simple blocking valves, also e.g. 3/2-way valves or bistable magnetic valves can be used, which may each be integrated in the modular valve structure.

FIG. 1 shows a dual-channel electropneumatic axle modulator 1 for a brake system (merely indicated here), in certain embodiments, an electronic brake system (EBS) 2 of a utility vehicle 2. The axle modulator 1 has an electronic control unit (ECU) 3, first electromagnetic pilot valves 4, 5, 6, a first relay valve 7 and a first pressure sensor 8 for a first brake circuit 9, e.g. of a rear axle of a utility vehicle, and correspondingly second pilot valves 14, 15, 16, a second relay valve 17 and a second pressure sensor 18 of a second brake circuit 19 of the rear axle of the utility vehicle. Thus the dual-channel electropneumatic axle modulator 1 can actuate both brake circuits 9 and 19.

If the electronic control unit 3 is switched off or has failed, the axle modulator 1 may allow analog brake operation, wherein an analog control brake pressure p4, which is entered by the driver via a brake pedal and a brake valve connected to the brake pedal via a pneumatic brake pressure control line 22 to an inlet port 23, may be output both at the first brake line 11 of the first brake circuit 9 and at a second brake line 21 of the second brake circuit 19.

The axle modulator 1 is described in more detail below with reference to the first brake circuit 9. In the first brake circuit 9, in various embodiments, a first redundancy valve 6 is provided as an electropneumatic 2/2-way pilot blocking valve, and correspondingly in the second brake circuit 19, a second redundancy valve 16 is provided which is, in certain embodiments, configured identically. The two redundancy valves 6, 16 are normally open. Thus the pneumatic inlet port 6a of the first redundancy valve 6 may be connected to its outlet port 6b, which in turn is connected via a pneumatic control line 30 to the control input (inlet port) 7a or pilot chamber 50 of the relay valve 7. The relay valve 7 thus may receive the analog brake control pressure p1 which is output via the outlet port 6b of the redundancy valve 6, in order to output to the first brake line 11 a reservoir pressure (system pressure) p0 taken by its first reservoir pressure port 10 from a compressed air store depending on the brake control pressure p1. In various embodiments, this provides a pneumatic fallback level on failure of the electronic control unit 3.

If the electronic control unit 3 is switched on and fault-free, the redundancy valves 6 and 16 may be powered during braking, i.e. blocked, and the further electromagnetic pilot valves 4, 5 and correspondingly 14 and 15 may be actuated. Here accordingly, in the first brake circuit 9, system pressure p0 is given by the reservoir port 10 via the cycled inlet valve 4 to the pneumatic control line 30 and hence to the control input 7a of the relay valve 7. The electronic control unit 3 here measures the output control pressure p2 via the pressure sensor 8 and cycles the inlet valve 4 such that the desired pressure value is set in the pneumatic control line 30, which is then output, amplified in volume, by the relay valve 7 to the first brake line 11. Correspondingly, the first outlet valve 5 serves to purge the pneumatic control line 30 in that the first outlet valve 5 connects the pneumatic control device 30 to a purge port 31. The outlet valve 5 here may be actuated in cyclic or noncyclic fashion. FIG. 1 shows a feedback line 33 with choke in the first brake circuit 9, but this may in principle also be omitted.

Thus in the first brake circuit 9, in certain embodiments, the three electromagnetic pilot valves 4, 5, 6 serve for pneumatic precontrol or actuation of the pneumatic control input 7a of the relay valve 7, and are connected by their outlet ports 4b, 5b, 6b via the pneumatic control line 30 to the pneumatic control input 7a of the relay valve 7.

The first pilot valves 4, 5, 6 together with connected lines may form a first electropneumatic pilot unit 32 (actuation module) to which the electronic control unit 3 is electrically connected, and to which also the control input 7a of the relay valve 7 may be pneumatically connected. Furthermore, the pilot unit 33 may comprise the above-mentioned pneumatic connections, i.e. the reservoir pressure port 10 for the reservoir pressure p0, the inlet port 23 for the pneumatic brake pressure control line 22, and a purge port 31.

The electropneumatic pilot unit 32 may be placed as a unit on the relay valve 7, wherein in the hardware configuration, the ports 4b, 5a and 6b protrude towards an underside 32b of the pilot unit 32 and are connected directly to the control input 7a of the relay valve 7, in certain embodiments, even into a pilot chamber or piston chamber of the relay valve 7, so that the pneumatic control line 30 need not be implemented separately and may actually be omitted in the hardware configuration or be regarded as part of the pilot chamber of the relay valve 7.

The hardware configuration of the three first pilot valves 4, 5, 6 is evident in particular from FIGS. 2 to 5. Here, the pilot valves 4, 5, 6 advantageously may share a common yoke bracket 34, which may be C-shaped or U-shaped, in other words, half open with two legs 34a and 34b and a middle bracket region 34c, wherein the pilot valves 4, 5, 6 are each received by their ends in the two legs 34a and 34b. The bracket 34 may be made from a soft magnetic or magnetically conductive material, e.g. ferritic steel, and may be produced accordingly by bending an iron or steel plate. Two yoke bushes 35, 36 of soft magnetic material, e.g. ferritic steel, may be inserted in the legs 34a and 34b for each pilot valve 4, 5, 6.

Between the pilot valves 4, 5, 6, interruptions 44 or holes may be formed in the legs 34a and 34b in order to suppress a magnetic crossflow between the pilot valves 4, 5, 6.

The configuration of the pilot valves 4, 5, 6 may be substantially identical and they may therefore be described jointly. In certain embodiments, each has a valve axis A, the axial direction of which is described below as the x direction; the pilot valves 4, 5, 6 lie next to each other in a transverse direction y and are connected to the control unit 3 and relay valve 7 in the vertical z direction. Thus a symmetry axis B of the relay valve 7 lies in the z direction and hence perpendicular to the valve axes A.

The coil 38 is actuated via its electrical contacts 39a, 39b (plug contacts) and surrounds the valve interior 40 with the valve axis A. An armature 42 which can be moved in the axial direction x, and a core 43 (valve tube) adjoining this in the axial direction x, are received in the valve interior 40 and are again each made of a soft magnetic material, e.g. ferritic steel. Thus when the coil 38 is powered, a magnetic flux is generated which is closed firstly in the direction of the valve axis A by the armature 42 and the core 43 to the legs 34a and 34b of the yoke bracket 34, and then via the middle bracket region 34c of the yoke bracket 34.

Figure 3:
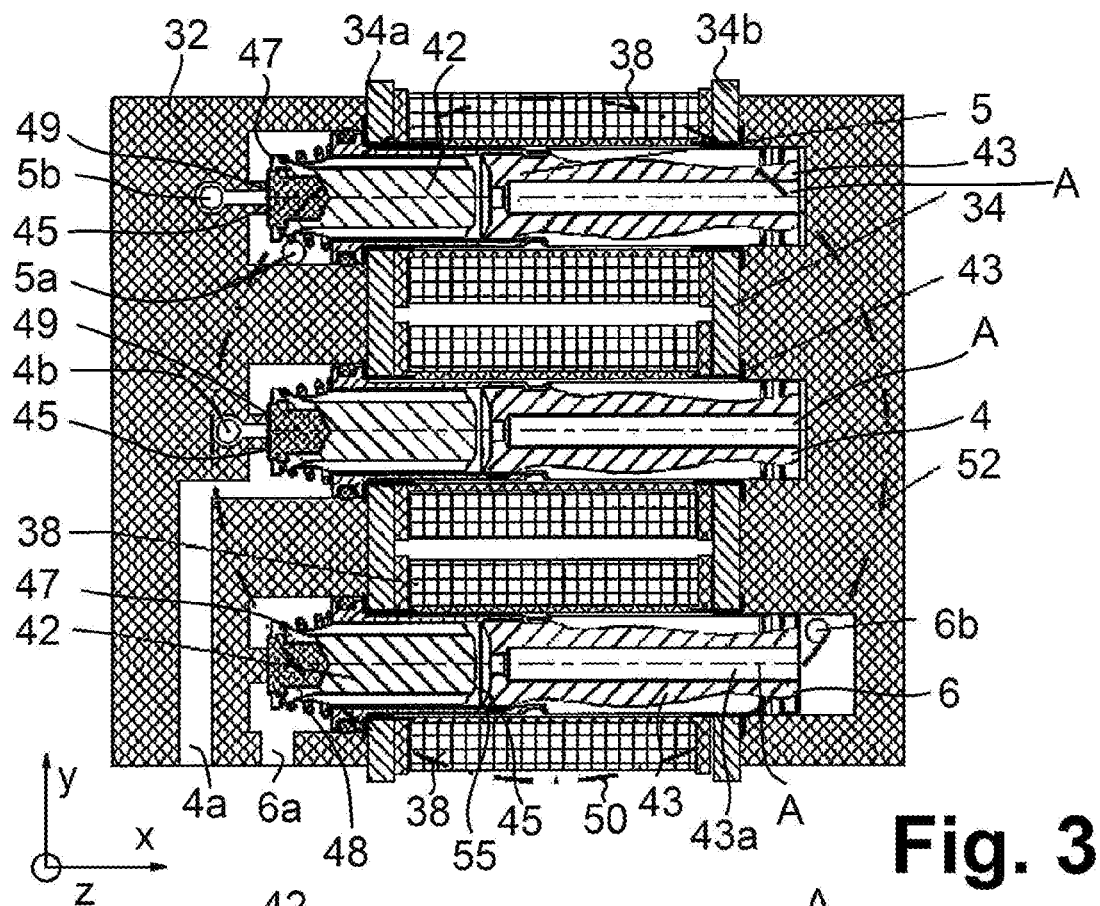
FIG. 3 is a diagrammatic section through a horizontal plane of the control unit according to one embodiment.

The inlet valve 4 and outlet valve 5 are normally closed 2/2-way magnetic (solenoid) valves, while the redundancy valve 6 is a normally open (self-conducting) 2/2-way blocking valve. Correspondingly, according to FIGS. 3 and 4, the configuration or connection diagram of the three pilot valves 4, 5, 6 differs:

In FIG. 3, the outer periphery 52 of the control piston 51 lying at the bottom of the relay valve 7 is indicated as a dotted circle. The pilot chamber 50 is provided accordingly to form a small adjustable gas volume with the shape of the outer periphery 52 between the control piston 51 and the pilot unit 32.

According to the embodiment in FIG. 3, the three pilot valves 4, 5, 6 are oriented similarly, i.e. their respective armatures 42 lie towards a common left connection side, wherein the three pilot valves 4, 5, 6 are received next to each other in the lateral y direction between the legs 34a of the yoke bracket 34. In this embodiment, the inlet port 6a of the redundancy valve 6 lies at the armature 42, so that compressed air can pass through slots (armature slots) 48 of the armature 42 in the axial direction x through the armature 42 to the valve seat 45, which is formed between the armature 42 and the core (valve tube) 43 adjoining this in the axial direction x. The core 43 is formed with a continuous bore 43a which leads to the outlet port 6b of the redundancy valve 6. The armature 42 is thus pressed by its armature spring 47 against the stop 49. In the unpowered basic state of the redundancy valve 6 shown, compressed air thus passes from the inlet port 6a through the slots 48, the open valve seat 45 and the continuous bore 43a to the outlet port 6b.

When the coil 38 of the redundancy valve 6 is powered, the armature 42 is moved against the action of its armature spring 47 in the axial direction x and contacts the valve seat 45, so that the pneumatic passage between the slots 48 and the continuous bore 43a of the core 43 is thereby closed. Thus the redundancy valve 6 blocks.

According to the embodiment shown, the inlet valve 4 is also formed with a continuous bore 43a, but in principle this is not necessary since it is configured as a normally closed 2/2-way blocking valve with pneumatic ports on one side. Its inlet port 4a thus lies against the supply port 10 with reservoir pressure p0. According to the embodiment shown, the armature 42 at its stop 49 may form the valve seat 45 for its outlet port 4b. The outlet port 4b may be guided directly vertically downward to the pilot chamber 50 of the relay valve 7, in the vertical direction or z direction i.e. into the drawing plane of FIG. 3.

The outlet valve 5 is itself formed as a normally closed 2/2-way blocking valve corresponding to the inlet valve 4, wherein its inlet port 5a again, corresponding to ports 6b and 4b, leads directly vertically to the pilot chamber 50 of the relay valve 7. Its outlet port 5b lies outside the outer periphery 52 of the valve piston 51 and may therefore also be routed away vertically downward to an output line for the purge 31. In the basic state shown, therefore, the two pilot valves 4, 5 are closed since their armatures 42 each lie at the stop 49 and thus form a closed valve seat 45. The armature 42 of the two pilot valves 4, 5 may be configured without armature slots 48, and the core 43 may also be configured without the bore 43a. The embodiment shown in FIG. 3 however allows the use of similarly configured and hence standardized pilot valves 4, 5, 6 which, with the same structure and same geometric formation, are each received in recesses 54 of the legs 34a, 34b of the yoke bracket 34.

Figure 4:
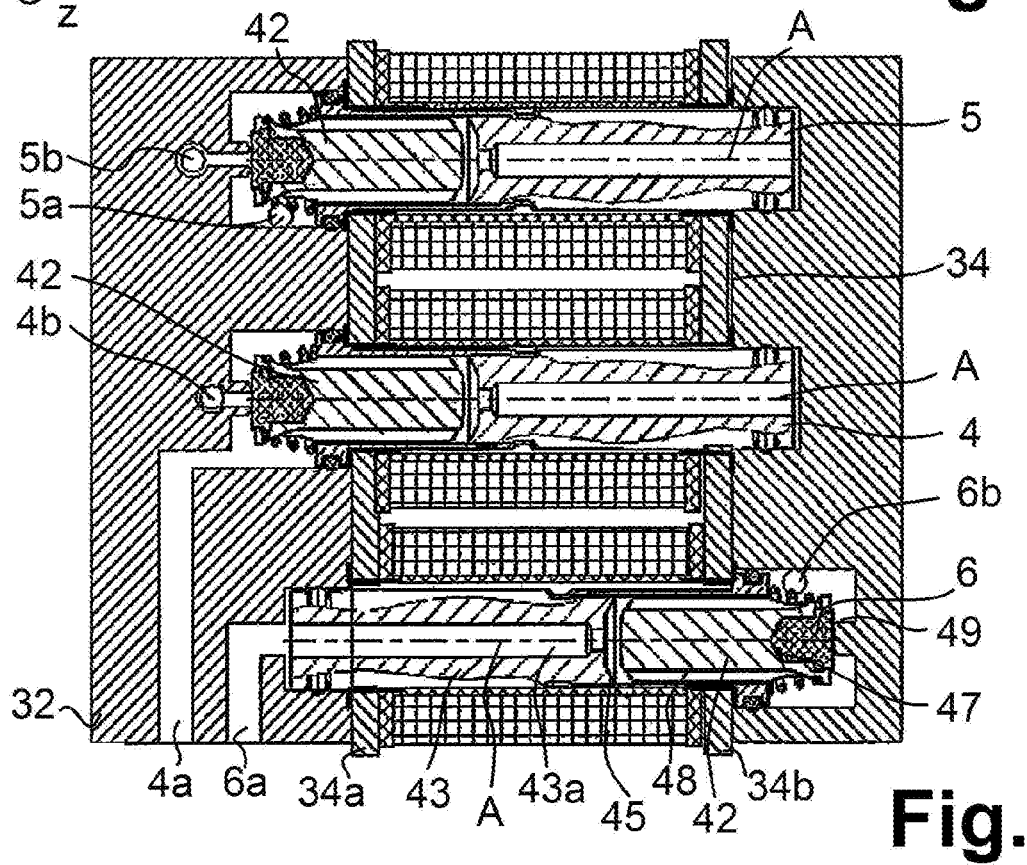
FIG. 4 is a depiction corresponding to FIG. 3 with a different valve arrangement.

FIG. 4 shows an alternative embodiment to FIG. 3 in which the redundancy valve 6 is provided in the inverted geometric arrangement. Compressed air passes from the inlet port 6a of the redundancy valve 6 through the core 43 or a continuous bore 43a of its core 43 to the valve seat 45, which is formed between the core 43 and the movable armature 42, and along side slots 48 of the core 42 to the outlet port 6b. The armature 42 is thus adjustable in length between the valve seat 45 and its armature stop 49, and springpreloaded via its armature spring 47 against the armature stop 49. When the coil 38 is powered, the armature 42 is thus moved against the action of its armature spring 47 towards the valve seat 45 and closes this. In this embodiment, the outlet port 6b of the redundancy valve 6 also runs downward, i.e. in the negative vertical z direction, directly to the control input 7a of the relay valve 7, i.e. it opens directly into a pilot chamber 50 which is formed in the relay valve 7 and acts directly on a valve piston 51 (or valve diaphragm) of the relay valve 7.

In principle therefore, electromagnetic 2/2-way blocking valves with any function, both normally closed and normally open, may be arranged in the yoke bracket 34; also other solenoid valves e.g. 3/2-way valves may be used.

The armature 42 may be formed with a seal 55, e.g. rubber, at both axial ends or at one axial end, depending on whether e.g. the stop should be damped only at the respective valve seat 45 or also on the other stop.

Figure 5:
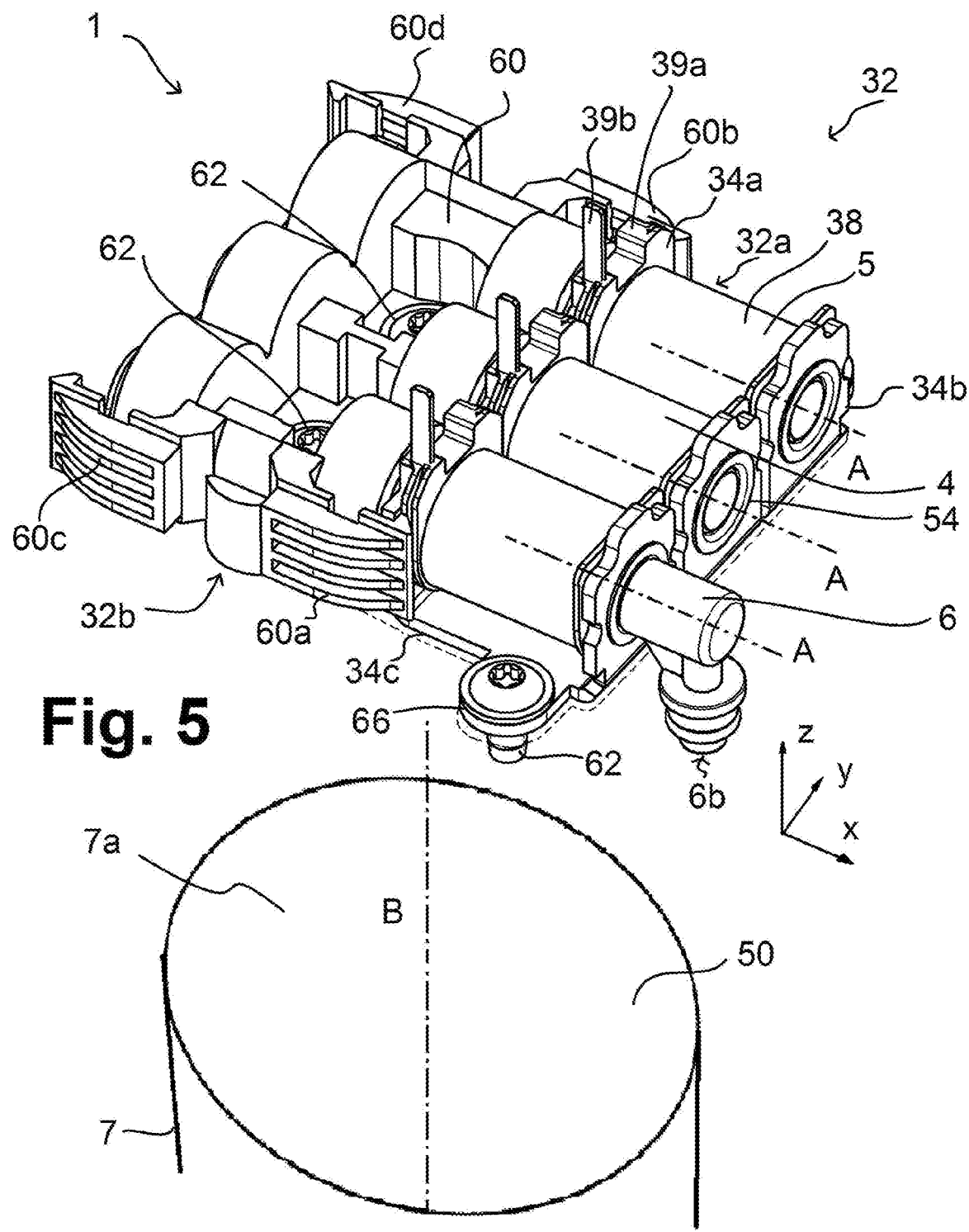
FIG. 5 is a perspective view of the electropneumatic pilot unit from FIG. 3.

FIGS. 3 to 5 show an embodiment with three pilot valves 4, 5, 6. In principle however, embodiments with e.g. two pilot valves are possible, i.e. one yoke bracket 34 with its legs 34a, 34b extending in the y direction to receive only two valves, or also with more than three valves. In some cases, incorrect connection or incorrect installation may be prevented by incorrect connection protection in the end region of the core 43 (valve tubes) e.g. a poka-yoke contour for mounting.

Thus a modular system is possible which can be formed very economically, in that a common yoke bracket 34 can be shortened accordingly from a semifinished product and receive an arbitrary number of several electromagnetic valves or pilot valves 4, 5, 6 next to each other in the y direction.

According to FIG. 5, an air guidance element 60, in certain embodiments, a plastic injection molding, is placed on the left connection side in the axial direction x. Installation may take place by automatic locking or latching, e.g. by the two snap hooks 60a and 60b (latching hooks) shown, which e.g. engage on the leg 34a of the yoke bracket 34 and allow a tight contact, in some cases with additional seal. Here, the latching hooks do not necessarily have to be able to absorb the resulting pneumatic pressure forces, since after complete installation of the device, these forces are received by the screws connecting the pilot components to the relay valve.

Figure 6:
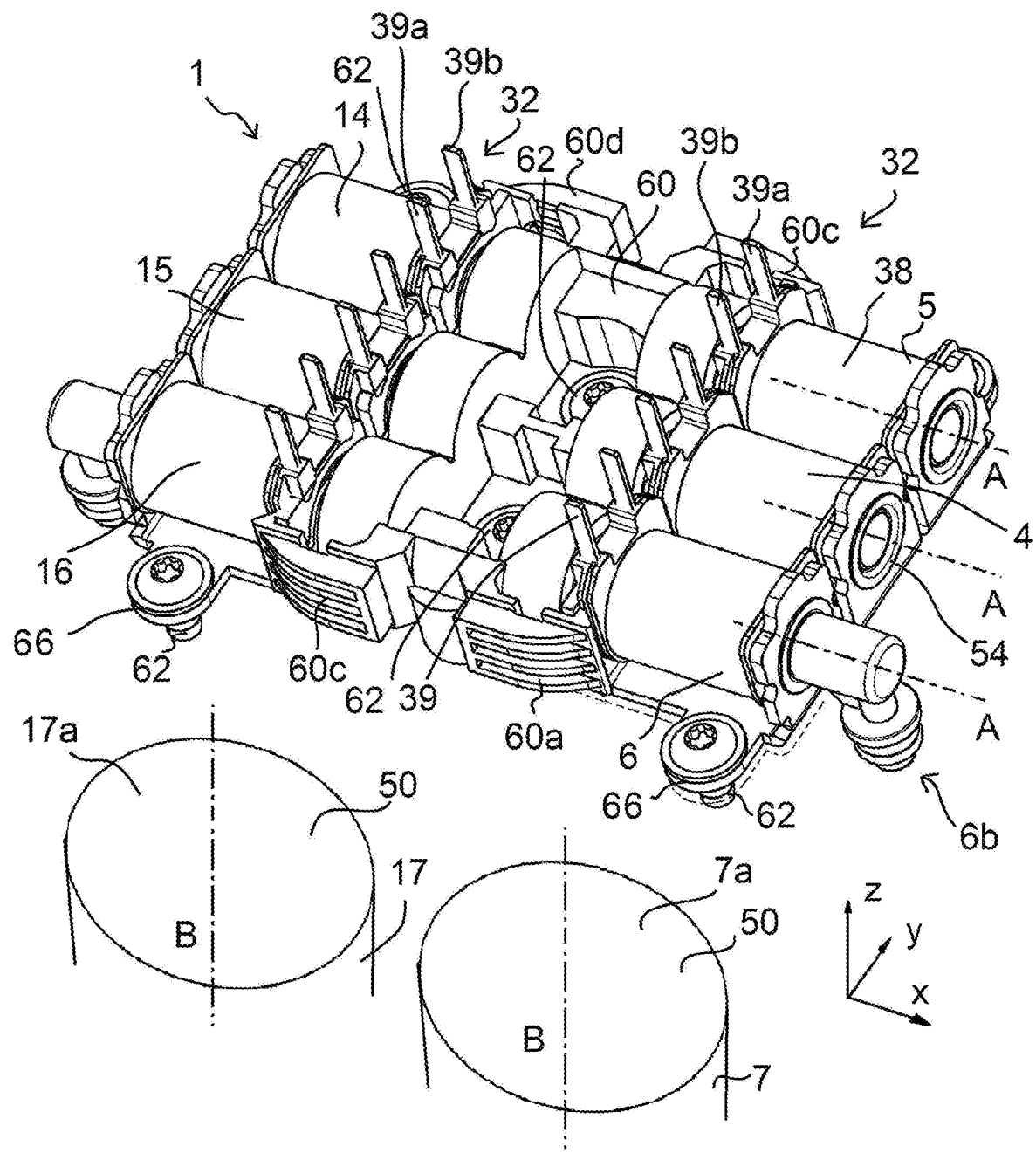
FIG. 6 is a view corresponding to FIG. 5 on connection of two pilot units for two brake channels to form an axle modulator (without ECU)

According to an exemplary embodiment as shown in FIG. 6, the dual-channel axle modulator 1 may be formed directly, in that two electropneumatic pilot units 32 for the two brake circuits 9 and 19 are positioned on either side of the central air guidance element 60 and latched accordingly via the snap hooks 60a, 60b, 60c, 60d. Thus a pilot unit 32 (or an actuation module) is formed which is placed in the vertical direction or z direction onto the two relay valves 7, 17 and screwed to the relay valve configuration via e.g. six screws 62.

With such a configuration, complete preassembly and testing of the pilot unit or the electromagnetic pilot unit 32 is possible, i.e. both pneumatic and electrical testing. This module may then be mounted directly onto the relay valves 7, 17.

The pressure sensors 8 and 18 shown in FIG. 1 may also be connected directly to the air guidance element 60, e.g. by formation of corresponding channels or passages in the air guidance element 60. The contact pins 39a, 39b of the pilot valves 4, 5, 6 form a contact interface for application of the electronic control unit 3, so that the electronic control unit 3 can be plugged onto the top side 32a of the pilot unit 32. The electronic control unit 3 may therefore be connected vertically as a circuit board or similar circuit carrier.

The electropneumatic pilot unit 32 formed in this way may then be placed in the vertical direction, i.e. in the z direction according to the figures, onto the relay valves 7, 17, in certain embodiments, with the relay valve gasket 56 in between. Thus a rapid actuation is necessary, with a small air volume to be moved and also a small air volume to be purged. The pneumatic control line 30 drawn in FIG. 1 is thus formed merely by small vertical bores at the ports 4b, 5a, 6b, or the pneumatic control line 30 already also forms the pilot chamber 50 of the relay valve 7.

Thus a low energy consumption is also necessary, since small air volumes must be moved and purged for actuation, with rapid actuation of the valves 4, 5 and 6 and hence a small electrical current requirement.

Furthermore, accordingly, further pressure sensors may be integrated, in certain embodiments, to measure the reservoir pressures p0 and/or the actuated control pressures, and placed on the circuit board of the electronic control device 3.

The relay valve gasket 56 may be used as a shaped gasket, i.e. a sealant layer for complete sealing of all channels. Compared with a configuration with individual O-rings, installation thus becomes simpler and cheaper.

Figure 7:
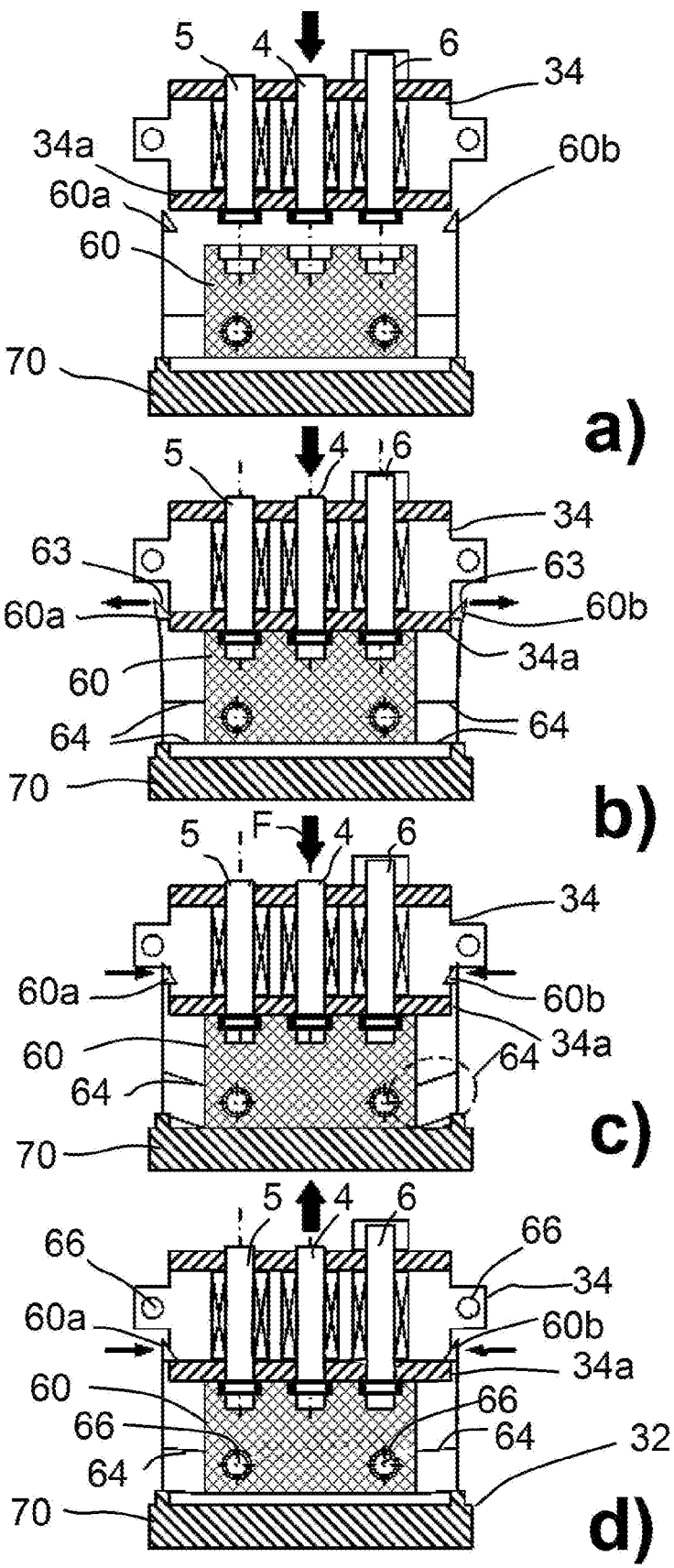
FIG. 7 is the part steps a) to d) of assembling the pilot unit.

FIG. 7 shows the part steps a) to d) of assembly or production of the pilot unit 32 in various embodiments. In part step a), the air guidance element 60 with its snap hooks 60a and 60b is placed on an assembly jig 70.

Then in part step b), the assembly unit formed from the pneumatic pilot valves 4, 5, 6 with their common yoke bracket 34 may be placed from above on the air guidance element 60 with mounting force F. The snap hooks 60a and 60b are formed with run-in chamfers 63 along which the valves 4, 5, 6 slide, e.g. with their common yoke bracket 34. The snap hooks 60a and 60b here bend elastically outward until, in part step c), the snap hooks 50a and 60b enter the space between the legs 34a, 34b of the yoke bracket 34, so that the snap hooks 60a, 60b snap back slightly because of the elastic effect of their webs.

Furthermore, in this embodiment, the snap hooks 60a and 60b are connected to the cast body of the air guidance element 60 via elastic adjustment regions 64, wherein the adjustment regions 64 may be formed for example as parallelogram-web configurations 64 or as other parallel-guidance devices. Here, according to part step c), the adjustment regions 64 bend elastically such that the snap hooks 60a and 60b are moved inward to the pilot valves 4, 5, 6. Thus the snap hooks 60a and 60b lie against the leg 34a of the yoke bracket 34.

On subsequent elimination of the mounting force F which acts vertically downward, the yoke bracket 34 is pressed with a residual force against the snap hooks 60a and 60b. This residual force or mechanical tension holds the resulting pilot unit 32 together during subsequent installation, which takes place via screw holes 66 and the screws 62 also shown in FIG. 5.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "–" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

LIST OF REFERENCE SIGNS (PART OF APPLICATION)

1 Dual-channel electropneumatic axle modulator
2 Brake system

3 Electronic control unit (ECU)
4, 5, 6; 14, 15, 16 Electropneumatic pilot valves
4 First inlet valve, cyclic 2/2-way blocking valve
4a Inlet port of inlet valve 4
4b Outlet port of inlet valve 4
5 Outlet valve, 2/2-way blocking valve
5a Inlet port of outlet valve 5, to relay valve 7
5b Outlet port of outlet valve 5, to purge 31
4c Electric control input of inlet valve 4
5c Electric control input of outlet valve 5
6 Redundancy valve, 2/2-way blocking valve
6a Inlet port of first redundancy valve 6
6b Outlet port of first redundancy valve 6
6c Electric control input of first redundancy valve 6
7 First relay valve
7a Inlet port of first relay valve 7
8 First pressure sensor
9 First brake circuit (brake channel)
10 First reservoir pressure port
11 First brake line (to wheel brakes)
14 Second inlet valve, cyclic 2/2-way blocking valve
15 Second outlet valve
16 Second redundancy valve
17 Second relay valve
18 Second pressure sensor
19 Second brake circuit, brake channel
20 Second reservoir port
21 Second brake line (to wheel brake)
22 Analog pneumatic brake pressure control line from brake valve and brake pedal
p0 Reservoir pressure, system pressure
p2 Control pressure EDS
p1 Brake control pressure analog (from pneumatic brake pressure control line 22)
30 Pneumatic control line between relay valve 7 and pilot valves 4, 5, 6
32 Electropneumatic pilot unit, actuation module
32a Top of pilot unit 32
32b Underside of pilot unit 32
33 Feedback line
34 Yoke bracket
34a First leg of yoke bracket 34
34b Second leg of yoke bracket 34
34c Middle bracket region of yoke bracket 34
35, 36 Yoke bushes
38 Coil
39a, b Contacts of coil
42 Armature
43 Core, valve tube
43a Continuous bore in core 43
44 Interruptions or holes in legs 34a, b
45 Valve seat
47 Armature spring
48 Slots in armature 42
49 Stop
50 Pilot chamber of relay valve 7, corresponds to inlet port 7a of relay valve 7
51 Control piston or diaphragm of relay valve 7
52 Outer periphery of control piston 51
54 Recess in legs 34a, 34b
55 Seal at armature 42
56 Relay valve seal
60 Air guidance element, in particular plastic injection molding
60a, 60b, 60c, 60d Snap hooks, latching hooks
62 Screws
63 Run-in chamfer of snap hooks 60a and 60b
64 Elastic adjustment regions, e.g. parallelogram-web configurations of air guidance element 60
66 Screw holes
A Valve axis
B Symmetry axis of relay valve 7
F Mounting force
x Axial direction of valves
y Transverse direction
z Vertical direction, direction of symmetry axis B

What is claimed is:

1. A pilot unit for controlling a fluid-actuated consumer, wherein the pilot unit comprises:
at least two electromagnetic pilot valves including a first pilot valve and a second pilot valve comprising:
a coil for producing a magnetic flux along a valve axis,
an armature which can be moved in an axial direction of the valve axis,
a valve seat which can be closed and opened by the armature, and
a fluid inlet port for a fluid and a fluid outlet port for the fluid;
wherein the first and second pilot valves lie next to each other with parallel valve axes, and wherein the fluid outlet port of the first pilot valve and the fluid inlet port of the second pilot valve protrude towards a common underside for connection to a pilot chamber of the consumer, and
a redundancy valve that lies adjacent to at least one of the first and second pilot valves with a valve axis that is parallel to the valve axes of the first and second pilot valves, the redundancy valve having an outlet port that protrudes toward the common underside for connection to the pilot chamber of the consumer, such that the outlet port of the first pilot valve, the inlet port of the second pilot valve, and the outlet port of the redundancy valve are oriented orthogonal to the valve axes of the first and second pilot valves and the redundancy valve.

2. The pilot unit as claimed in claim 1, wherein a common fluid guidance element is connected to the first and second pilot valves in the axial direction.

3. The pilot unit as claimed in claim 2, wherein the fluid guidance element is attached to the first and second pilot valves by form fit and/or by at least one latch to form the pilot unit as a unitary component.

4. The pilot unit as claimed in claim 3, wherein the fluid guidance element is formed with elastic adjustment regions and with elastically adjustable snap hooks serving as the at least one latch, which have run-in faces for automatic adjustment to the first and second pilot valves on installation, wherein the elastic adjustment regions are configured to form a biasing force pressing the valves against the fluid guidance element via the snap hooks.

5. The pilot unit as claimed in claim 3, wherein the fluid guidance element is attached to the first and second valves at a leg of the common yoke bracket.

6. The pilot unit as claimed in claim 2, wherein the pilot unit is formed with two channels for control of a dual-channel axle modulator, wherein for each brake circuit, a plurality of pilot valves with a common yoke bracket are connected to the fluid guidance element in the axial direction on both sides.

7. The pilot unit as claimed in claim 2, wherein the common fluid guidance element is connected to the first and second pilot valves in the axial direction to form further ports of the pilot valves.

8. An actuator system, wherein the actuator system comprises:
a fluid-actuated consumer, and
a pilot unit as claimed in claim 1;
wherein the pilot unit is placed on a pilot chamber, which forms the fluid inlet port of the consumer, in a direction vertical to an axial direction of the electromagnetic pilot valves.

9. The actuator system as claimed in claim 8, wherein an electronic control unit is placed on the pilot unit in the vertical direction.

10. The actuator system as claimed in claim 8 further comprises an electropneumatic axle modulator.

11. The actuator system as claimed in claim 8, wherein the fluid-actuated consumer comprises a relay valve.

12. The actuator system as claimed in claim 8, wherein the actuator system is a dual-channel electropneumatic axle modulator for a brake system of a utility vehicle.

13. The actuator system as claimed in claim 12, wherein the actuator system comprises two relay valves as fluid-actuated consumers which stand perpendicular to the valve axes of the first and second pilot valves.

14. The pilot unit as claimed in claim 1, wherein the first and second pilot valves have a common yoke bracket for closing the magnetic flux outside the valve axes of the first and second pilot valves, wherein the common yoke bracket has two legs extending in a lateral direction, and wherein the first and second pilot valves lying next to each other are each placed between the two legs.

15. The pilot unit as claimed in claim 14, wherein material weakening points are formed in the legs of the common yoke bracket.

16. The pilot unit as claimed in claim 15, wherein the material weakening points comprise interruptions, holes, or a combination thereof.

17. The pilot unit as claimed in claim 1, wherein each of the first and second pilot valves comprises contact pins, and wherein the contact pins of the first and second pilot valves each protrude in a direction vertical to the axial direction for plug-in contact with a control unit placed thereon.

* * * * *